(12) United States Patent
Nagel et al.

(10) Patent No.: US 10,663,832 B1
(45) Date of Patent: May 26, 2020

(54) INDICATOR FOR WINDOWS

(71) Applicant: Kinestral Technologies, Inc., South San Francisco, CA (US)

(72) Inventors: Paul Nagel, South San Francisco, CA (US); Antoine Dubois, South San Francisco, CA (US)

(73) Assignee: KINESTRAL TECHNOLOGIES, INC., Hayward, CA (US)

(*) Notice: Subject to any disclaimer, the term of this patent is extended or adjusted under 35 U.S.C. 154(b) by 432 days.

(21) Appl. No.: 15/230,056

(22) Filed: Aug. 5, 2016

Related U.S. Application Data

(60) Provisional application No. 62/202,520, filed on Aug. 7, 2015.

(51) Int. Cl.
| | |
|---|---|
| *E06B 9/24* | (2006.01) |
| *G02F 1/153* | (2006.01) |
| *G02F 1/163* | (2006.01) |
| *G02F 1/13* | (2006.01) |
| *G08B 21/18* | (2006.01) |
| *G08B 5/36* | (2006.01) |
| *G08B 3/10* | (2006.01) |
| *G08B 6/00* | (2006.01) |

(52) U.S. Cl.
CPC .......... *G02F 1/1533* (2013.01); *G02F 1/1309* (2013.01); *G02F 1/163* (2013.01); *G08B 3/10* (2013.01); *G08B 5/36* (2013.01); *G08B 6/00* (2013.01); *G08B 21/18* (2013.01)

(58) Field of Classification Search
CPC ............... E06B 2009/2464; E06B 9/24; E06B 2009/2405; E06B 3/6715; E06B 3/6722; G02F 1/163; B60J 3/04
See application file for complete search history.

(56) References Cited

U.S. PATENT DOCUMENTS

| | | | | |
|---|---|---|---|---|
| 5,920,256 A * | 7/1999 | Toffolo | ................... | G01D 13/10 |
| | | | | 340/461 |
| 6,111,684 A * | 8/2000 | Forgette | ............... | B60Q 1/2665 |
| | | | | 359/267 |
| 7,535,614 B1 * | 5/2009 | Tapley | ....................... | B60J 3/04 |
| | | | | 359/265 |
| 8,292,228 B2 * | 10/2012 | Mitchell | ................... | G02F 1/15 |
| | | | | 244/129.3 |
| 2007/0285759 A1 * | 12/2007 | Ash | ........................... | B60J 3/04 |
| | | | | 359/275 |
| 2009/0096631 A1 * | 4/2009 | Bunk | ..................... | H01H 9/182 |
| | | | | 340/815.55 |
| 2011/0002106 A1 * | 1/2011 | Bentley | .................. | H05K 5/069 |
| | | | | 361/752 |
| 2012/0293855 A1 * | 11/2012 | Shrivastava | .............. | E06B 9/24 |
| | | | | 359/275 |
| 2013/0278989 A1 * | 10/2013 | Lam | .......................... | B60J 3/04 |
| | | | | 359/275 |
| 2014/0177028 A1 * | 6/2014 | Shrivastava | ............ | G02F 1/153 |
| | | | | 359/275 |

(Continued)

*Primary Examiner* — William R Alexander
*Assistant Examiner* — Balram T Parbadia
(74) *Attorney, Agent, or Firm* — Womble Bond Dickinson (US) LLP

(57) ABSTRACT

A window is provided. The window includes an electrochromic device having variable transmissivity and a region of the electrochromic device arranged with an indicator that is configured to indicate one of levels of the transmissivity or changes of the transmissivity of the electrochromic device.

20 Claims, 8 Drawing Sheets

(56) References Cited

U.S. PATENT DOCUMENTS

2014/0268287 A1* 9/2014 Brown ................. G02F 1/1523
359/275
2015/0138224 A1* 5/2015 Kim ................. G02B 27/0172
345/592

* cited by examiner

INDICATOR FOR WINDOWS

BACKGROUND

Electrochromic materials are in use in windows (often called smart windows) and mirrors with electrically controlled transmissivity (e.g., tinting). Automotive mirrors are self-dimming, responding to light levels as detected by sensors. The bleached state of an electrochromic device has the greatest transmissivity, and the colored state of an electrochromic device has the least transmissivity. Minimum and maximum states of transmissivity of an electrochromic device may be self-evident to an observer, but intermediate levels of transmissivity, increments of transmissivity, or slow transitions of transmissivity, may be less readily noticed. It is in the above context that present embodiments arise.

SUMMARY

In some embodiments, a window is provided. The window includes an electrochromic device having variable transmissivity and a region of the electrochromic device arranged with an indicator that is configured to indicate one of levels of the transmissivity or changes of the transmissivity of the electrochromic device.

In some embodiments, an electrochromic window is provided. The window includes an electrochromic device with controllable transmissivity, a visual indicator, visible through a surface of the electrochromic device, and wherein the visual indicator is controllable to show changes or levels of the transmissivity of the electrochromic device.

In some embodiments, an electrochromic window is provided. The window includes an electrochromic device, a visual indicator, embedded in the electrochromic window, and a controller, configured to control transmissivity of the electrochromic device and configured to direct the visual indicator to indicate levels or changes of the transmissivity of the electrochromic device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A smart window is herein disclosed as having an indicator that indicates transmissivity levels, changes, or progress of changes, etc., to a user. In various embodiments, the indicator is embedded in or integrated with the smart window, such as attached or formed on to an interior surface or sandwiched between panes in an integrated glazing unit (IGU). The indicator may be sandwiched between two panes of glass affixed to each other in a non-IGU assembly in some variations. In some embodiments, the indicator includes or is made of electrochromic material, which could be controlled passively, or actively, or both. In some embodiments, the indicator includes lights of various types, in various arrangements. Other types of display technology could be used, such as liquid crystal display. An indicator could be located in various places on a smart window, such as in a corner, in a middle of an edge, along an edge, in a middle region or other region of the smart window, etc.

Figure 1:
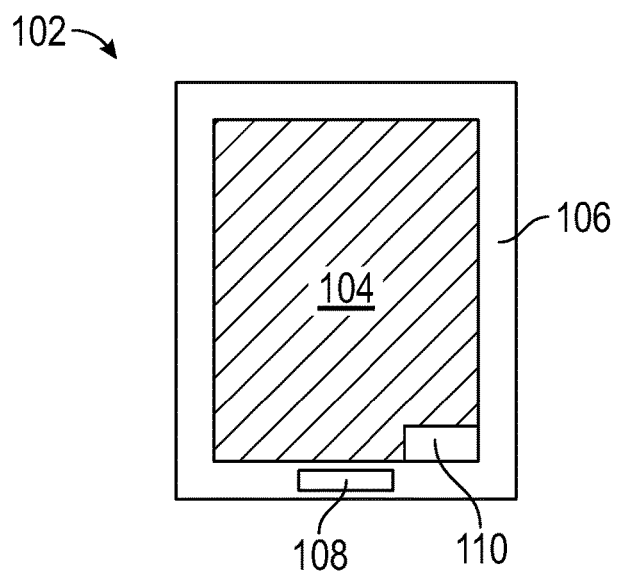
FIG. 1 is a diagram of a smart window with an electrochromic device, a control or driver module, and an indicator that indicates transmissivity of the smart window, integrated with the smart window in accordance with some embodiments.

FIG. 1 is a diagram of a smart window 102 with an electrochromic device 104, a control or driver module 108, and an indicator 110 that indicates transmissivity of the smart window 102, integrated with the smart window 102 in accordance with an embodiment of the present description. A smart window 102 within such a system can be defined as a window with some local and/or external or remote computer processing capabilities and which is connectable to the internet. In some embodiments the smart window is an electrochromic window but this is not meant to be limiting as non-electrochromic windows may be smart windows as described herein. Electrochromic and non-electrochromic windows may be integrated into the same system in some embodiments. The smart window 102 may function as a glass partition in some embodiments and be within an interior of a structure rather than have one surface facing an exterior in some embodiments. It should be appreciated that indicator 110 may be integrated onto a single pane, double pane, any IGU or non-IGU assembly, any electrochromic or non-electrochromic assembly. In addition, indicator 110 may be integrated onto an interior glass partition, room separator, or other interior architecture application. Although the indicator 110 is depicted as located in a corner of the smart window 102, more specifically in a corner of the electrochromic device 104, in various embodiments the indicator 110 could be located elsewhere as described above. Typically, the electrochromic device 104 includes one or more panes of glass or plastic, and electrochromic material such as in various films or layers, with transparent conductive oxide, ion storage or transport material, bus bars, electrodes, etc. Some embodiments of the electrochromic device 104 are in an integrated glazing unit, with a frame 106 as shown in FIG. 1. The control or driver module 108 could include a driver for supplying current or voltage to the electrochromic device 104, and control electronics such as a processor or state machine, etc., and could be located inside the integrated glazing unit, or in the frame, or external to the integrated glazing unit, among other possibilities. A wired or wireless interface could also be included in the control or driver module 108, so that the smart window 102 can communicate with other controllers and/or a network. The indicator 110 may be part of a communication and control network may be a dynamic user input control system that includes input components such as a wall controller, keypads, touchpads, voice control (such as the Amazon Echo), wearable devices (such as watches, collars, and ear attachments), mobile devices (such as tablets and phones), or a web interface. Sensors can be included in the control or driver module 108. Some embodiments of a smart window system include a distributed device network, with smart windows 102, sensors, communication, and connection to an external network such as the Internet. The indicator 110, in various embodiments, indicates which level of transmissivity the electrochromic device 104 has or will have upon completion of a change of transmissivity, a ratio of a level of transmissivity to a minimum or a maximum transmissivity, whether a change of transmissivity is in progress, what amount of a change of transmissivity has been completed or is yet to complete, i.e., a progress status of a transmissivity change, and/or other aspects of transmissivity and change of transmissivity of a smart window 102. In some embodiments, indicator 110 that a window is selected on a controller or within an application (prior to any change occurring). The indicator may be configured to indicate the state of a window, e.g., window not closed properly, etc., or a security breach. The indicator 110 could be directed or controlled by the control or driver module 108, or directed or controlled by a controller external to the smart window 102 via an interface to the control or driver module 108. Moreover, the indicator 110 could be mounted interior or exterior to the electrochromic device 104 in some embodiments.

Figure 2A:
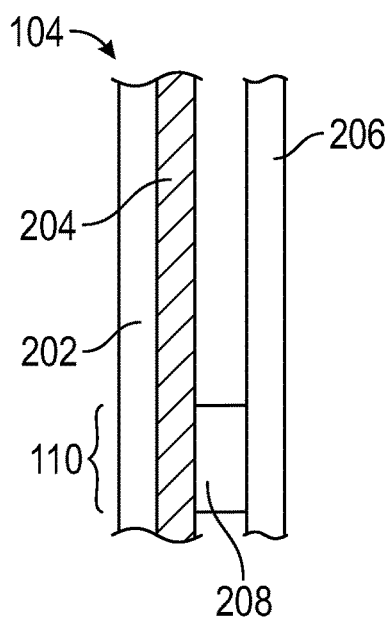
FIG. 2A is a cross-section view of a portion of a smart window, showing arrangement of an indicator in an interior of the smart window in accordance with some embodiments.

FIG. 2A is a cross-section view of a portion of a smart window 102, showing arrangement of an indicator 110 in an interior of the smart window 102. The electrochromic device 104 (from left to right in the drawing) has a first pane 202, which could be a front pane or a back pane of the smart window 102, one or more layers of electrochromic material 204, and a second pane 206, which could be a back pane or a front pane of the smart window 102. In this embodiment, the indicator 110 takes the form of a hardware module 208 affixed to an interior surface of the electrochromic device 104 or sandwiched between panes or otherwise arranged in the interior of the smart window 102. Seals and other components of an integrated glazing unit could be devised and arranged. The indicator 110 could have lights or other visual display in the module 208, which could be visible through an exterior surface of the electrochromic device 104, for example through an exterior surface of the first pane 202 or the second pane 206.

Figure 2B:
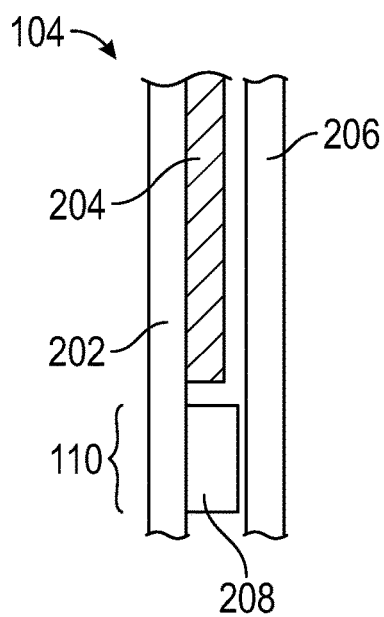
FIG. 2B is a cross-section view of a portion of a smart window, showing arrangement of an indicator in a region without electrochromic material, in an interior of the smart window in accordance with some embodiments.

FIG. 2B is a cross-section view of a portion of a smart window 102, showing arrangement of an indicator 110 in a region without electrochromic material, in an interior of the smart window 102. An arrangement in this embodiment could be made by cutting and removing a portion of the electrochromic material 204, forming the electrochromic material 204 so as to leave a region without electrochromic material, e.g., via application of masking or a barrier, or dimensioning the electrochromic material 204, etc. The embodiment shown in FIG. 2B shows the display contents of the hardware module 208 more clearly through the first pane 202 than does the embodiment shown in FIG. 2A.

Figure 2C:
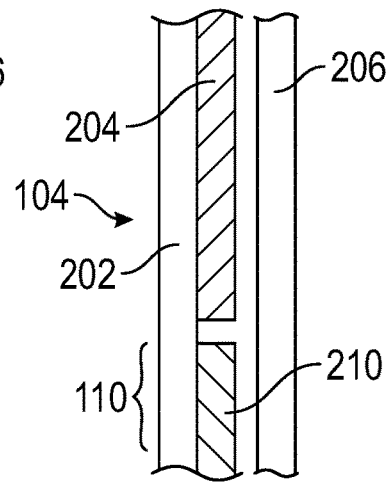
FIG. 2C is a cross-section view of a portion of a smart window, showing arrangement of an indicator that includes a portion of electrochromic material in accordance with some embodiments.

FIG. 2C is a cross-section view of a portion of a smart window 102, showing arrangement of an indicator 110 that includes a portion of electrochromic material 210. The portion of electrochromic material 210 for the indicator 110 could be controlled passively by the remaining electrochromic material 204 of the electrochromic device 104 (see, e.g., FIG. 3B), or could be controlled actively and independently of the electrochromic material 204 of the electrochromic device 104 (see, e.g., FIG. 3A).

Figure 3A:
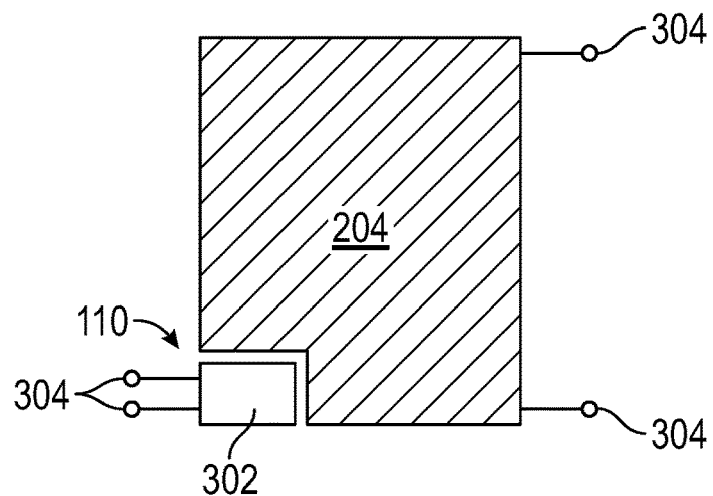
FIG. 3A depicts an embodiment of an indicator as a separately electrically controllable portion of electrochromic material in accordance with some embodiments.

FIG. 3A depicts an embodiment of an indicator 110 as a separately electrically controllable portion of electrochromic material 302. Electrodes 304 of the portion of electrochromic material 302 are connected to bus bars belonging to that portion of electrochromic material 302, and are not connected to electrodes 304 or bus bars of the remaining electrochromic material 204 of the electrochromic device 104. Electrodes 304 of the remaining electrochromic material 204 of the electrochromic device 104 are used for controlling transmissivity of the electrochromic device 104, which is independent of the transmissivity of the portion of electrochromic material 302 as controlled by electrodes 304 of the portion of electrochromic material 302. This constitutes active, independent control of transmissivity of the indicator 110, and could be implemented as shown in the cross-section view of FIG. 2C. The portion of electrochromic material 302 could be made to switch sooner than, or later than, and faster, slower or at the same rate as the transmissivity of the remaining electrochromic material 204.

Figure 3B:
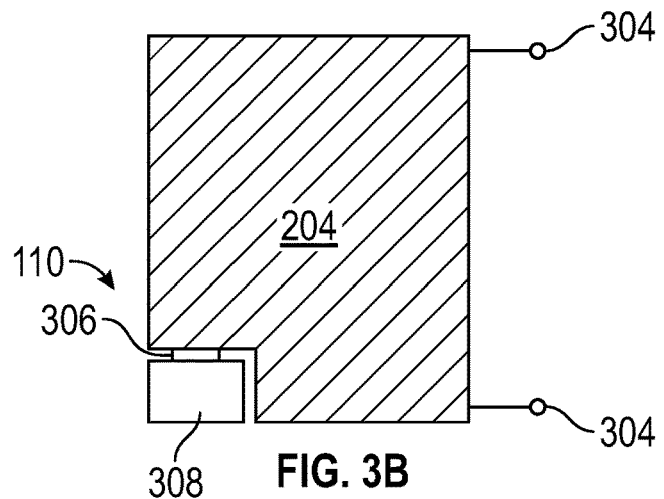
FIG. 3B depicts an embodiment of an indicator as a portion of electrochromic material with passive control in accordance with some embodiments.

FIG. 3B depicts an embodiment of an indicator 110 as a portion of electrochromic material 308 with passive control. A coupling device 306 couples the portion of electrochromic material 308 to the remaining electrochromic material 204 of the electrochromic device 104. For example, the coupling device 306 could be resistive material, or an electrically controlled switch. Since the portion of electrochromic material 308 lacks bus bars or electrodes, transmissivity of the portion of electrochromic material 308 is controlled passively through the coupling device 306. In some embodiments, the portion of electrochromic material 308 has one or more shared bus bars or electrodes in common with the remaining electrochromic material 204. In an embodiment where the coupling device 306 is electrically controlled switch (e.g., transistor, relay, or electronic circuit), the control or driver module 108 can control the switch. Generally, the passively controlled portion of electrochromic material 308 would switch transmissivity at a different rate, e.g., more slowly or faster, than the remaining electrochromic material 204 in some embodiments.

Figure 3C:
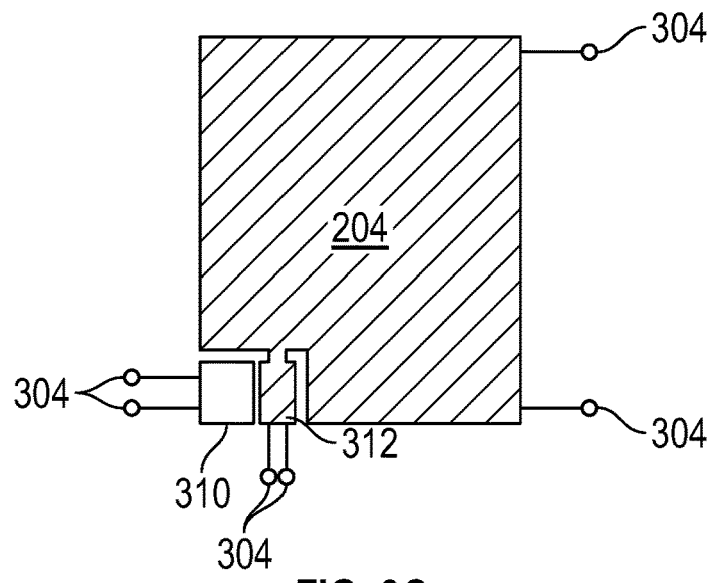
FIG. 3C depicts an embodiment of an indicator as a portion of electrochromic material with a combination of active and passive control in accordance with some embodiments.

FIG. 3C depicts an embodiment of an indicator 110 as a portion of electrochromic material 310, 312 with a combination of active and passive control. One portion of electrochromic material 310 has transmissivity that is actively controlled via electrodes 304, which are independent of other electrodes 304 of the device. Another portion of electrochromic material 312 has transmissivity that is passively controlled, e.g., as in the embodiment of FIG. 3B. As a variation, the portion of electrochromic material 312 could have both passive control as in FIG. 3B and active control in the form of electrodes 304. Shapes depicted in the embodiments shown in FIGS. 3A-3C, and elsewhere, should not be seen as limiting, and can be modified to suit a design. It should be appreciated that the indicator may integrated inside the glass, e.g., as a liquid crystal display (LCD) or light emitting diode (LED), or encapsulated between layers making the glass itself a display.

Figure 4:
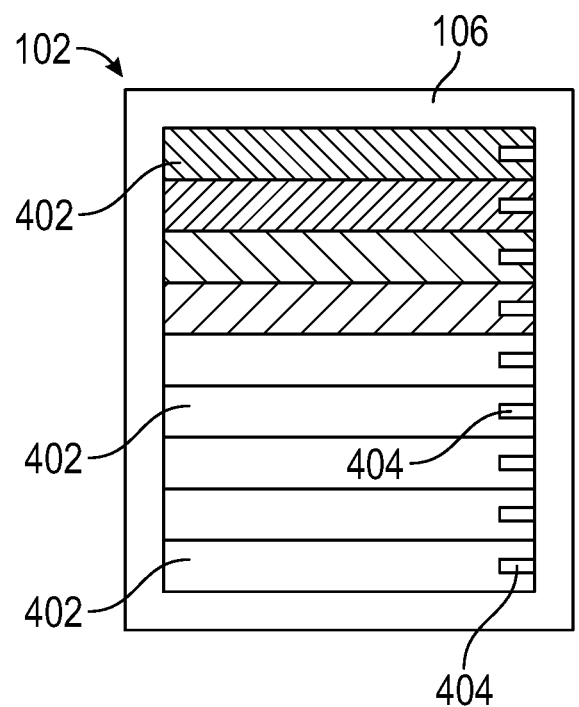
FIG. 4 shows an embodiment of a smart window with individually controlled zones, each of which has a portion of an indicator in accordance with some embodiments.

FIG. 4 shows an embodiment of a smart window 102 with individually controlled zones 402, each of which has a portion of an indicator 110. This could be implemented with multiple bus bars, for example one at the boundary between each two zones 402, and one more at each of the top and bottom of the electrochromic device 104, so that each zone 402 has two bus bars and bus bars are shared by zones 402. Each zone 402 could have a respective hardware module 208 (see FIGS. 2A-2C), or a hardware module 208 that spans most or all of the zones 402 could be employed. Each portion of the indicator 110 could be directed to display in accordance with transmissivity of that zone 402 in some embodiments.

Figure 5:
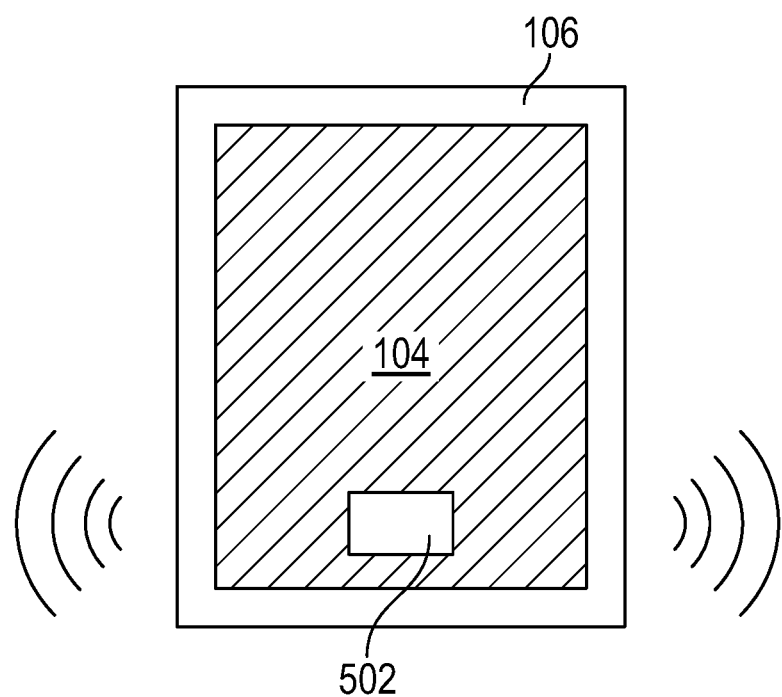
FIG. 5 shows a smart window with an acoustic or vibrational indicator in accordance with some embodiments.

FIG. 5 shows a smart window 102 with an acoustic or vibrational indicator 110. This embodiment of an indicator 502 has a speaker, a piezoelectric device, a motorized eccentrically weighted device or other electrically driven device that produces a sound or vibration. The sound or vibration could emanate from the indicator 502 itself, or from a first pane 202 and/or second pane 206 (see FIGS. 2A-2C) that the acoustic or vibrational indicator 110 is attached to and excites. For example, an acoustic indicator 502 could produce a sound at the beginning of a transmissivity change, and another sound (which could be the same sound, repeated, or a differing sound) at the end of the transmissivity change, or speech, music, etc. A vibrational indicator 502 could vibrate glass or plastic of a smart window 102, turning one or both exterior surfaces of the smart window 102 effectively into a low-frequency sounding board and/or providing tactile feedback to a user. The audio embodiment may be integrated with or utilized separately from the visual indicators discussed herein. It should be appreciated that vibrational indicator 502 may be attached to an edge of the glass in some variations. In addition, vibrational indicator 502 may transmit vibration or hit the glass, or a protective transmitting surface attached to the glass, to create sound, e.g., with a hammer system hitting or vibrating the glass in a controlled uniform or variable pitch.

Figure 6:
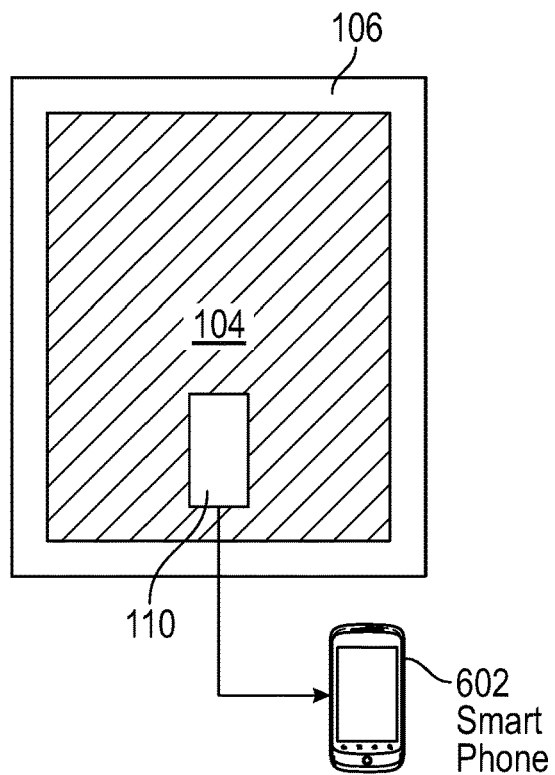
FIG. 6 shows a smart window with an indicator that communicates, using infrared, with a smart phone or other user device in accordance with some embodiments.

FIG. 6 shows a smart window 102 with an indicator 110 that communicates, using infrared, with a smart phone 602 or other user device. In one embodiment, the indicator 110 has an infrared transmitting device, such as an infrared light emitting diode (LED), and the smart phone 602 has an infrared receiving device, such as an infrared detector (e.g., a phototransistor or photodiode). In some embodiments, infrared transceivers (e.g., an infrared transmitter and an infrared receiver) could be used in each of the smart phone 602 and the indicator 110. Visible light in place of infrared light may be integrated into the embodiments and a camera can function as a receiving device for the visible light embodiments. In some versions, the smart phone 602 determines which of multiple smart windows 102 in a room or other region is communicating with the smart phone 602. For example, each smart window 102 could employ a unique identifier in infrared signaling, the smart phone 602 could look at signal strength of an infrared signal, smart windows 102 could coordinate and take turns signaling with infrared, and so on. It should be appreciated that alternatives to infrared wavelengths may be integrated with the embodiments described above. In addition, communication may be achieved through sound via controlled pitch and sound variations emitted by the glass and received by the phone. In some embodiments, a microphone may be integrated into the IGU or glass so that the glass amplifies the sound to receive voice commands or detect user presence, position, etc. It should be appreciated that movement sensors, proximity sensors, temperature sensors, cameras, etc., may be integrated into the embodiments and automatically triggered through the embodiments described herein.

Figure 7:
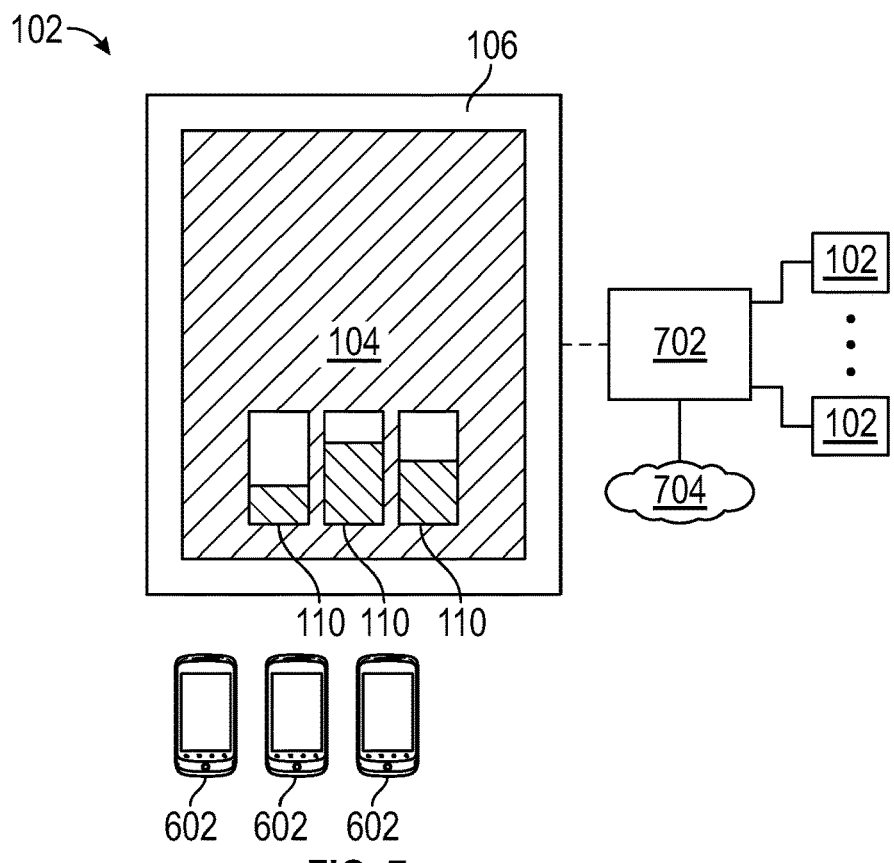
FIG. 7 shows a smart window that supports and indicates voting for a transmissivity setting in accordance with some embodiments.

FIG. 7 shows a smart window 102 that supports and indicates voting for a transmissivity setting. Communication with smart phones 602 could be supported using infrared signaling (or other suitable wavelengths of light) as described with reference to FIG. 6. In some embodiments, wireless coupling could be supported, for example by a wireless interface in the control or driver module 108. Users would then vote using their smart phones 602. In this embodiment, the indicator 110 is shown with multiple bar graphs, each of which shows a setting according to a vote of a user. Other arrangements for depicting voting are readily devised. The control or driver module 108, or other component of a distributed device network or other control system for a smart window 104, could manage the voting and direct a transmissivity setting to the electrochromic device 104, and an indication of the voting on the indicator 110, in accordance with the voting. Voting can be done through many individual controllers or through desktop software, not limited to smartphone. In some embodiments, voting can be performed in software, and indicated with assistance from hardware. In a further embodiment, the voting is done in software and the results of voting are shown on a smart phone or other user device application. Software performing the voting could reside in a smart window 102, in a distributed smart window system, or on one or more smart phones or other user devices. Control decisions can use hierarchy between landlord, tenant, occupants, employees, and automation rules, where inputs converge to a computing device that uses voting weighting, priorities, learning behaviors and data analytics (of temperature, light, glare, sun movement, time of day, statistical information, etc.) to make decision on tinting of the glass, as well as lighting, Heating ventilation and air conditioning (HVAC) controls and more.

Figure 8:
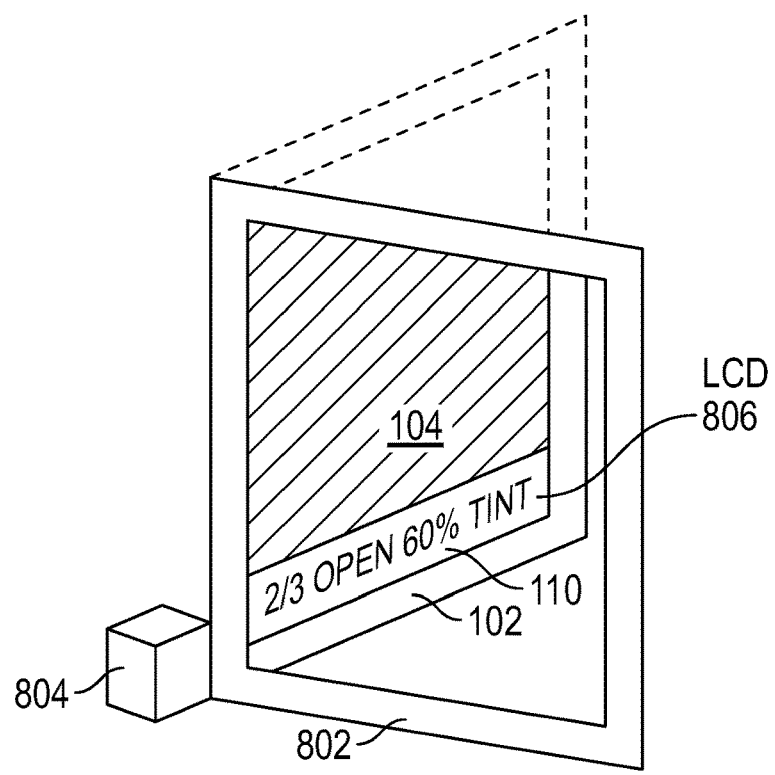
FIG. 8 is a perspective view of an embodiment of a smart window with motorized opening and closing, and an indicator that uses a liquid crystal display (LCD) in accordance with some embodiments.

FIG. 8 is a perspective view of an embodiment of a smart window 102 with motorized opening and closing, and an indicator 110 that uses a liquid crystal display (LCD). A motor 804, for example controlled by the control or driver module 108, opens and closes the window. The liquid crystal display 806 shows, for example in alphanumeric text, bar graphs or various regions, how much the window is open and how much the electrochromic device 104 is tinted, i.e., the transmissivity setting, or other aspect of transmissivity. The liquid crystal display 806 could be smaller than that shown in FIG. 8, or located elsewhere, etc. Some embodiments have a smart window 102 with an electrochromic device, and further embodiments have a smart window 102 without an electrochromic device. These embodiments could have controllable features like motorized opening and closing, motorized shades, etc., and various types of indicators 110.

Figure 9:
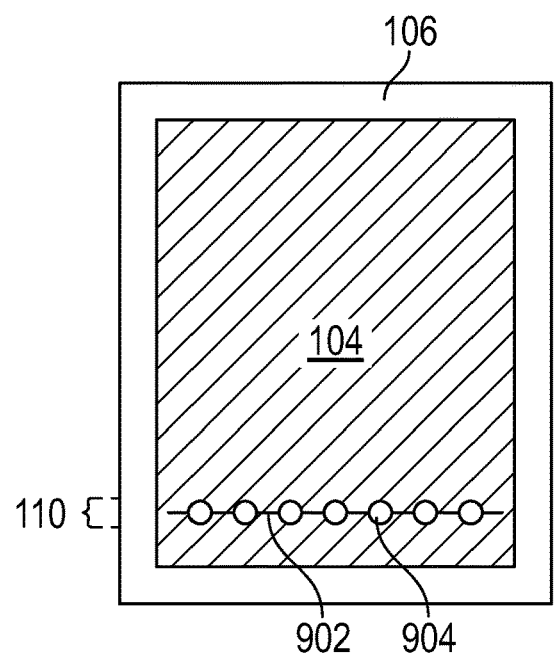
FIG. 9 depicts a smart window with an indicator that has lights electrically connected with conductive ink in accordance with some embodiments.

FIG. 9 depicts a smart window 102 with an indicator 110 that has lights 904 electrically connected with conductive ink 902. This indicator 110 and other embodiments with lights 904 can use light emitting diodes, organic light emitting diodes (OLEDs), incandescent lamps (e.g., grain of wheat bulbs) or other types of electric lights. The conductive ink 902 could be applied to an interior surface in the smart window 102, such as on a first pane 202 or second pane 206 or a surface of the electrochromic device 104, and could connect lights 904 in series, in parallel, or with individual connection to each light 904 or group of lights 904, etc. In one embodiment, bare LED dies are attached to an interior surface in the smart window 102. These could be encapsulated after the conductive ink 902 is applied. In a further embodiment, segments of an electrochromic display, electrically connected with conductive ink 902 could be used for an indicator 110. In some embodiments, UV reactive ink, activated by UV light may replace the conductive ink.

Figure 10:
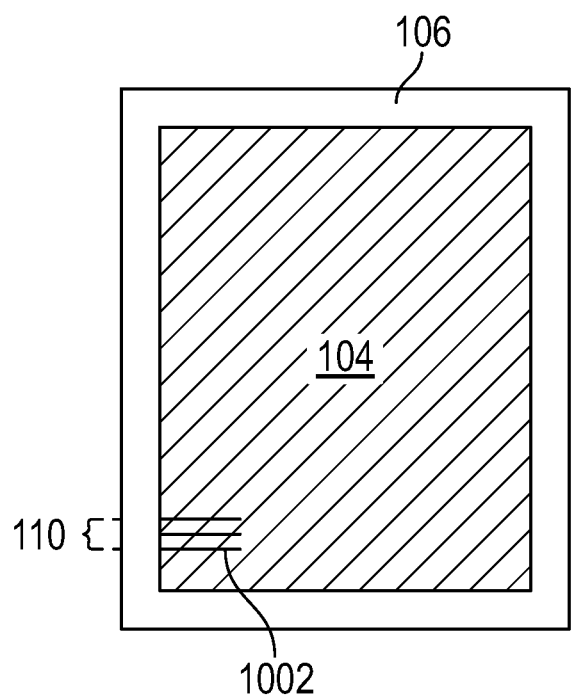
FIG. 10 shows a smart window with an indicator that has electroluminescent wire in accordance with some embodiments.

FIG. 10 shows a smart window 102 with an indicator 110 that has electroluminescent wire 1002. One or more strands of the electroluminescent wire 1002 could be arranged in various ways, such as in lines or rows, around the perimeter of the glass, along the edge of the glass, or outside the perimeter of glass, e.g., inside or along the spacer, or to spell out alphanumeric characters or make a symbol or pattern, etc. One or more multiple strands of electroluminescent wire 1002 could be arranged to create an animation. In some embodiments, engraved glass with light shining through the edge and light refracted inside the glass being caught by the engraving, is utilized as an indicator.

Figure 11:
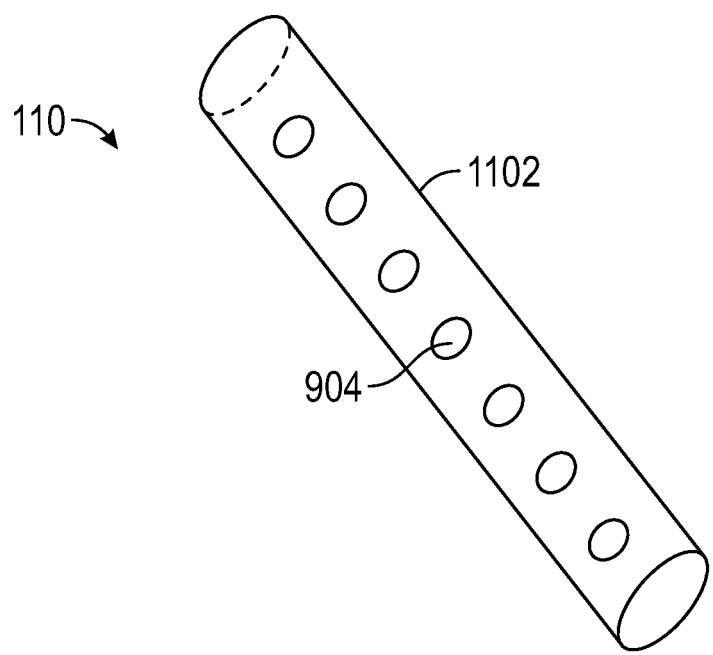
FIG. 11 is a perspective view of an indicator with lights in a tube or other full or partial enclosure, suitable for arrangement in the interior of a smart window in accordance with some embodiments.

FIG. 11 is a perspective view of an indicator 110 with lights 904 in a tube 1102, suitable for arrangement in the interior of a smart window 102. For example, the indicator 110 could be arranged as shown by the hardware module 208 in other FIG. 2A or FIG. 2B. Wiring is not shown, but readily devised. The indicator 110 of FIG. 11 could be an external indicator, added by user or installer, outside of the IGU, integrated to the window frame, wall or added over the window. In addition, the shape may be any suitable shape besides a tube, such as a flexible strip.

Figure 12:
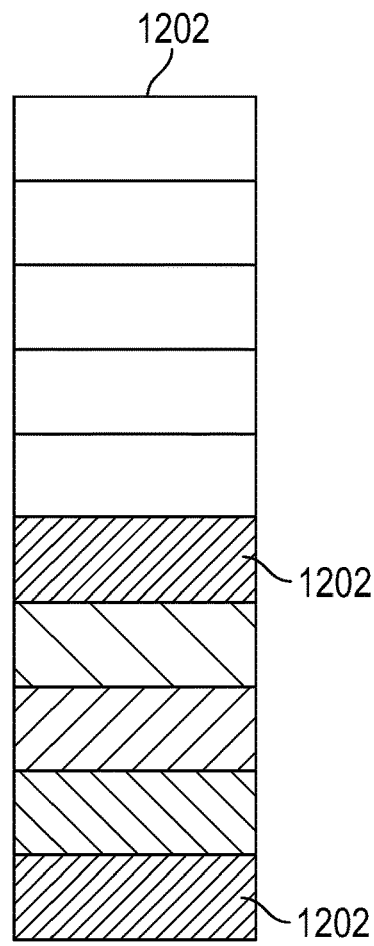
FIG. 12 depicts an indicator with multiple portions, arranged to show levels or progress in changes of transmissivity of a smart window in accordance with some embodiments.

FIG. 12 depicts an indicator 110 with multiple portions 1202, arranged to show levels or progress in changes of transmissivity of a smart window 102. The portions 1202 of the indicator 110 could be arranged as a bar graph, row or column, for example. The number of portions 1202 of the indicator 110 illuminated, colored, lightened or darkened by the control or driver module 108 could be proportional to the transmissivity, or to the amount by which the transmissivity of the electrochromic device 104 is changed or to be changed, etc. For example, if the current setting or the new setting is 40% of the way between the minimum and maximum transmissivity, or if the transmissivity change is 40% complete, the indicator 110 could show this by having 40% of the portions 1202 appear different from the remaining 60% of the portions 1202 of the indicator 110. Having half of the portions 1202 of the indicator 110 illuminated, brightened or colored could indicate midway in a change of transmissivity. In some embodiments, portions 1202 may not have to be incremented, i.e., the portions flow organically. It should be appreciated that numerous variations are possible with the visual appearance of the indicator.

Figure 13:
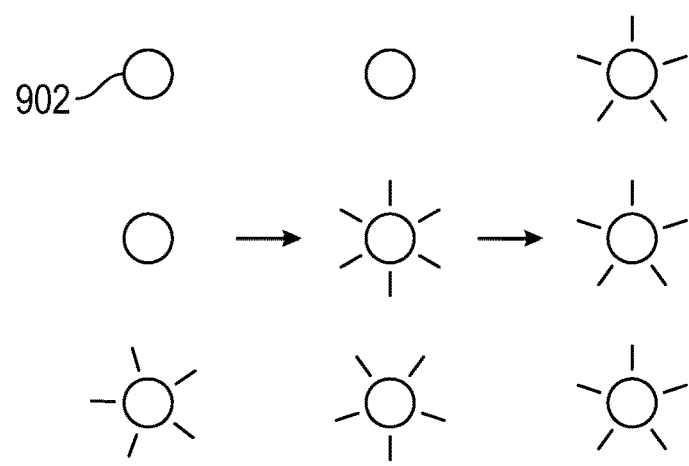
FIG. 13 shows an indicator with lights that are sequencing in accordance with some embodiments.

FIG. 13 shows an indicator 110 with lights 902 that are sequencing. For example, the lights could sequence from off to on in a column or row, from bottom to top or top to bottom, from left to right or right to left, from middle to outer edges or outer edges to middle, etc., to show that the transmissivity of a smart window 102 is changing. The sequencing could stop when the transmissivity stops changing. Other sequences are readily devised.

Figure 14:
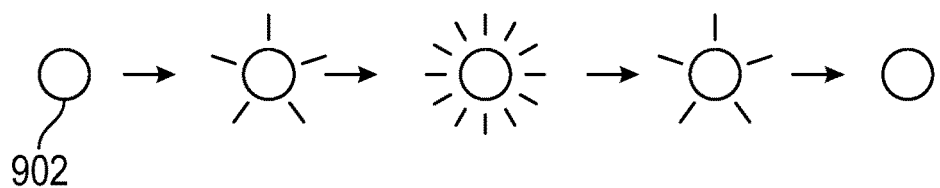
FIG. 14 shows an indicator with a light that is pulsing at different levels of brightness in accordance with some embodiments.

FIG. 14 shows an indicator 110 with a light 902 that is pulsing at different levels of brightness. For example, the light could pulse from dark to light and back to dark, just once or multiple times, using two or more light levels, to show that transmissivity of a smart window 102 is changing. Pulse rate could vary, for example from slowly pulsing to quickly pulsing as a change in transmissivity nears completion, to indicate level of transmissivity, or that window is selected on controller, or not closed properly, etc.

Figure 15:
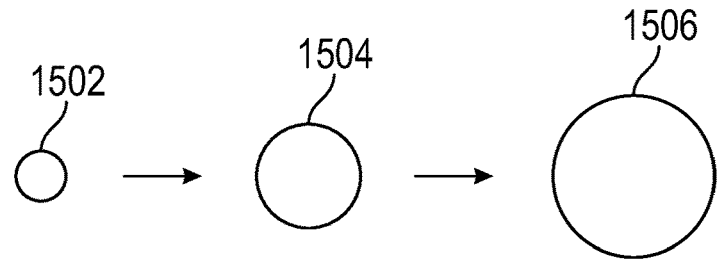
FIG. 15 shows an indicator that changes in apparent size. in accordance with some embodiments

FIG. 15 shows an indicator 110 that changes in apparent size. This could be accomplished by arranging lights 902 or regions of a liquid crystal display, or other portions of an indicator 110 in concentric circles, adjacent rows or columns, or other pattern to create the apparent size change. The apparent size could pulse larger and smaller, to show that transmissivity of a smart window 102 is changing. In some embodiments, the relative apparent size could be proportional to the level of transmissivity or tinting of the electrochromic device 104 or to the relative amount by which the transmissivity has changed or is changing. The size may change to a larger or smaller size, e.g., a bar that gets longer or shorter. In some embodiments, a color change may be integrated with the embodiments. In addition to size change, brightness change, saturation change or hue changes may be included also. It should be appreciated that FIGS. 12-15 can be combined in any combination.

Figure 16:
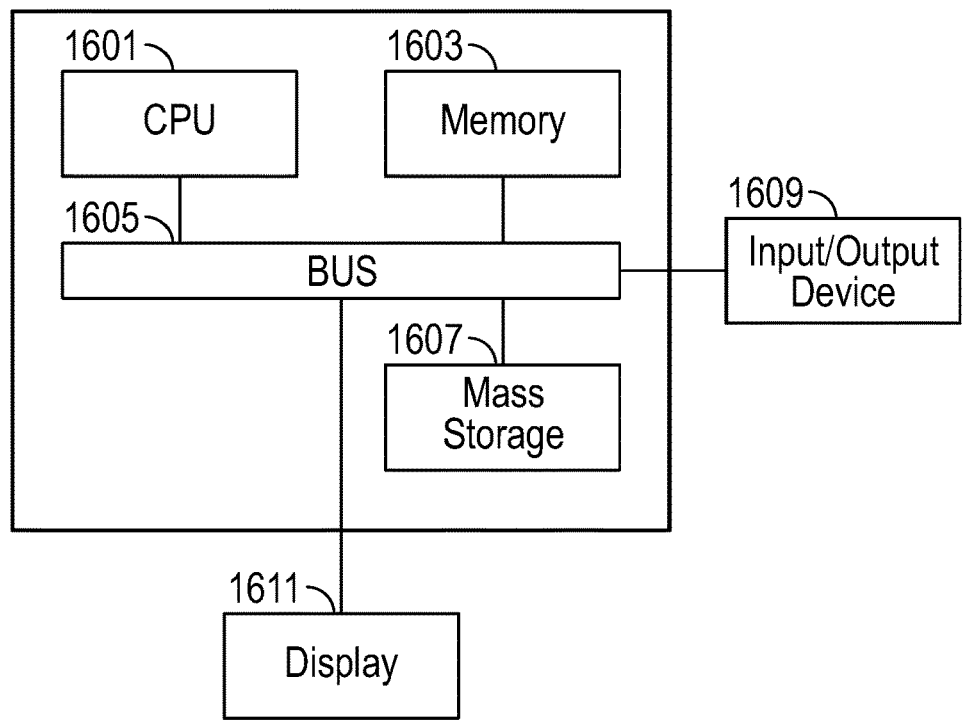
FIG. 16 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 16 is an illustration showing an exemplary computing device which may implement the embodiments described herein. The computing device of FIG. 16 may be used to perform embodiments of the functionality for the controlling a visual indicator for a smart window in accordance with some embodiments. The computing device includes a central processing unit (CPU) 1601, which is coupled through a bus 1605 to a memory 1603, and mass storage device 1607. Mass storage device 1607 represents a persistent data storage device such as a floppy disc drive or a fixed disc drive, which may be local or remote in some embodiments. Memory 1603 may include read only memory, random access memory, etc. Applications resident on the computing device may be stored on or accessed via a computer readable medium such as memory 1603 or mass storage device 1607 in some embodiments. Applications may also be in the form of modulated electronic signals modulated accessed via a network modem or other network interface of the computing device. It should be appreciated that CPU 1601 may be embodied in a general-purpose processor, a special purpose processor, or a specially programmed logic device in some embodiments.

Display 1611 is in communication with CPU 1601, memory 1603, and mass storage device 1607, through bus 1605. Display 1611 is configured to display any visualization tools or reports associated with the system described herein. Input/output device 1609 is coupled to bus 1605 in order to communicate information in command selections to CPU 1601. It should be appreciated that data to and from external devices may be communicated through the input/output device 1609. CPU 1601 can be defined to execute the functionality described herein to enable the functionality described with reference to FIGS. 1-15. The code embodying this functionality may be stored within memory 1603 or mass storage device 1607 for execution by a processor such as CPU 1601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A window, comprising:
an electrochromic device disposed between panes of the window having variable transmissivity; and
a region of the electrochromic device disposed between panes of the window arranged with an indicator comprising an acoustical, vibrational or visual display member that is disposed between the panes of the window and configured to indicate one of levels of the transmissivity or changes of the transmissivity of the electrochromic device.

2. The window of claim 1, wherein the region of the electrochromic device includes a resistive material arranged such that the region of the electrochromic device changes transmissivity more slowly or more quickly than a remainder of the electrochromic device.

3. The window of claim 1, wherein the region of the electrochromic device includes electrochromic material that is controllable independent of a remainder of the electrochromic device.

4. The window of claim 1, wherein the indicator includes lights attached to the region of the electrochromic device, interior to the window and contacting a surface of one of the panes of the window.

5. The window of claim 1, wherein the indicator is configured to indicate one of:
multiple levels of the transmissivity of the electrochromic device, a midway of a change of the transmissivity of the electrochromic device, or a ratio of transmissivity change progress.

6. The window of claim 1, wherein the indicator is an acoustic device attached to the region of the electrochromic device and configured to produce a first sound at a beginning of a change of the transmissivity and a second sound at an end of the change of the transmissivity.

7. The window of claim 1, wherein the indicator is a vibrational device attached to the region of the electrochromic device and configured to vibrate the electrochromic device to indicate the one of levels of the transmissivity or changes of the transmissivity.

8. An electrochromic window, comprising:
an electrochromic device with controllable transmissivity, the electrochromic device disposed between panes of the electrochromic window;
a visual indicator, comprising a visual display member visible through a surface of the panes of the window; and
the visual indicator controllable to show changes or levels of the transmissivity of the electrochromic device.

9. The electrochromic window of claim 8, wherein the visual indicator includes a transparent or translucent tube having therein LEDs (light emitting diodes) or OLEDs (organic light emitting diodes).

10. The electrochromic window of claim 8, wherein the visual indicator combines passive and active manipulation of electrochromic material.

11. The electrochromic window of claim 8, wherein the visual indicator includes lights pulsing at variable speeds or variable brightness.

12. The electrochromic window of claim 8, further comprising:
the electrochromic device including a first region of transparent conductive material and a second region of transparent conductive material disposed between the panes of the electrochromic window; and
a switch coupling the first region of transparent conductive material and the second region of transparent conductive material, wherein the second region of transparent conductive material acts as the visual indicator and is controllable independent of the first region of transparent conductive material, via the switch.

13. The electrochromic window of claim 8, wherein the visual indicator includes electroluminescent wire attached to a pane, interior to the electrochromic window.

14. The electrochromic window of claim 8, wherein the visual indicator includes conductive ink on a pane, interior to the electrochromic window.

15. An electrochromic window, comprising:
an electrochromic device disposed between panes of the electrochromic window;
a visual indicator, comprising a visual display member embedded in the electrochromic window, between the panes of the electrochromic window; and a controller, configured to control transmissivity of the electrochromic device and configured to direct the visual indicator to indicate levels or changes of the transmissivity of the electrochromic device.

16. The electrochromic window of claim 15, wherein the visual indicator includes one of: a plurality of LEDs (light emitting diodes), a plurality of OLEDs (organic light emitting diodes), or an LCD (liquid crystal display).

17. The electrochromic window of claim 15, wherein:
the electrochromic device has a plurality of zones, each zone controllable as to transmissivity independent of each other zone; and
the visual indicator includes a portion of the visual indicator in each zone.

18. The electrochromic window of claim 15, wherein:
the controller is configured to support voting for the transmissivity; and
the visual indicator is configured to indicate the voting.

19. The electrochromic window of claim 15, wherein the visual indicator includes an infrared emitter.

20. The electrochromic window of claim 15, wherein the controller is configured to direct the visual indicator to indicate a self-test or diagnostic of the electrochromic device.

\* \* \* \* \*